United States Patent [19]
Johnston et al.

[11] Patent Number: 5,605,384
[45] Date of Patent: Feb. 25, 1997

[54] ACCESS VALVE EVACUATION AND FILL OF INACCESSIBLE CAVITIES

[75] Inventors: Gary L. Johnston, Pleasant Hill; William C. Kruckemeyer, Beaver Creek; James W. Zehnder, II, Huber Heights; Michael L. Oliver, Xenia, all of Ohio

[73] Assignee: General Motors Corporation, Detroit, Mich.

[21] Appl. No.: 642,992

[22] Filed: May 6, 1996

[51] Int. Cl.$^6$ .................................................. B60T 17/04
[52] U.S. Cl. ..................... 303/113.1; 60/584; 303/119.1; 188/352
[58] Field of Search .............................. 188/352; 60/584; 303/113.1, 119.1, 116.1, 84.1, 84.2, 10, 116.4, 115.1, 115.4, 115.5; 141/59, 98

[56] References Cited

U.S. PATENT DOCUMENTS 5,538,335   7/1996   Saito et al. .............................. 188/352

*Primary Examiner*—Douglas C. Butler
*Attorney, Agent, or Firm*—Jeffrey A. Sedlar

[57] ABSTRACT

A braking system is provided with the addition of a normally closed access valve that is held in the open position during assembly of the braking system providing a path for the evacuation and fluid filling process of the braking system. Through the additional access valve, all areas, including otherwise inaccessible areas of the hydraulic circuit of the braking system are filled from one access point such as at the master cylinder assembly. After completion of the evacuation and fill process, the valve is closed and remains closed during all braking operation of the system.

20 Claims, 3 Drawing Sheets

ACCESS VALVE EVACUATION AND FILL OF INACCESSIBLE CAVITIES

BACKGROUND OF THE INVENTION

The present invention relates to the evacuation and fill of inaccessible cavities and more particularly, to the initial evacuation and filling process of a system using a normally closed access valve to evacuate and fill an otherwise inaccessible part of the system.

The preferred layout of systems such as vehicle braking systems may be such that the assembled system includes closed and inaccessible cavities in its normal state. Braking systems conventionally operate on hydraulic type fluid and are often capable of performing advanced functions such as anti-lock braking and traction control. Vehicle braking systems can also operate in introducing moments into the vehicle body as part of a stability enhancement system. Such advanced function braking systems generally incorporate components such as valves, pumps and accumulators which are interposed in the system and interact between the conventional master cylinder and wheel brake actuator. The introduction of these types of components to provide the selected braking functions of the braking system tend to complicate the initial fluid fill processes at the vehicle assembly plant. The components are generally assembled in a module and shipped to a vehicle assembly plant for incorporation into the remainder of a braking system.

With basic vehicle braking systems wherein the brake lines remain continuously open between the master cylinder and all parts of the system it is assured that fluid introduction into the assembled system at the master cylinder assembly can be accomplished without leaving unfilled segments. This becomes increasingly more difficult to achieve when the complexity of the system is increased and the number of components contained therein is multiplied. When system complexity results in effectively inaccessible segments from the master cylinder with the system deenergized, valves must be energized and actuated to completely fill the system from the master cylinder. This is generally considered undesirable in a fast paced assembly environment.

A known method of overcoming this problem, is to prefill the brake modulator with fluid during its assembly. The fluid filled modulator is then shipped to the vehicle assembly plant for assembly into the vehicle. This solution is less than desirable however, since the modulator requires open connection points for assembly to the braking system. A risk is created of fluid leaks during handling, which is particularly problematic since brake fluid is detrimental to painted surfaces such as those found on vehicle bodies.

SUMMARY OF THE INVENTION

It is an aim of the present invention to provide a means of ensuring that a braking system can be evacuated and filled with fluid through the master cylinder assembly without energizing valves and without providing other access routes to the otherwise closed loop braking system. During the process of evacuating and filling a brake system of the present invention, the bleed valves at the wheel brake actuators preferably remain closed. Through means of the present invention, brake modules are shipped to the vehicle assembly plant dry, and are assembled into the braking system prior to the introduction of braking fluid.

In achieving these purposes, the present invention preferably includes a valve that is normally closed but is held in an open position. The valve is assembled in the braking system to provide a bridge to a normally inaccessible part of the system. The bridge opens otherwise inaccessible parts of the system during the process of evacuation and filling through the master cylinder assembly. When the evacuation and fill process is completed, the normally closed valve is moved to a closed position and the bridge is sealed. Once the valve is closed it remains closed during operation of the braking system preventing fluid flow or fluid pressure transmission through the bridge which is provided solely for the evacuation and fill process during the initial assembly of the braking system and module into a vehicle. Optionally, the valve is configured to provide a means of re-establishing the bridge when servicing of the vehicle's braking system requires such an effect at a later time.

In accordance with a preferred embodiment of the present invention which is described in greater detail herein, a braking system includes a segment that is normally inaccessible from the master cylinder assembly and that is separated from the remainder of the braking system by a normally closed anti-lock braking system (ABS) operational valve. The present invention makes possible evacuation and fluid fill of the normally inaccessible segment of the system without powering the normally closed valve into an open position.

More specifically, a preferred braking system includes a master cylinder assembly that is interconnected with at least one wheel brake by an interposed brake line that extends therebetween. A second brake line extends from the first brake line and includes the normally closed ABS valve which positioned therein. A bridging line extends from the second brake line with a normally closed valve positioned in the bridging line that remains closed during all braking operation of the braking system. The bridging line's normally closed valve is held in an open position during assembly of the braking system for evacuation and fluid fill thereof. The normally closed valve is released to the closed position when assembly of the braking system is complete. The bridging line's normally closed valve remains closed during all base brake and advanced function operation of the braking system.

In accordance with a second preferred embodiment of the present invention which is described in greater detail herein, an access valve is provided that is automatically closed without the need to manually effect closure. According to this embodiment the braking system includes an access valve with a sliding element. The access valve is preferably positioned in the braking system between the pump assembly and the accumulator. The access valve provides an evacuation and fill path to an otherwise inaccessible part of the system.

The access valve's sliding element is initially held in an open position by frictional seal force. When the pump assembly is powered up for the first time in the braking system, the sliding element is moved to a closed position. The access valve remains closed from that point on during all operational functions of the braking system.

DETAILED DESCRIPTION OF THE PRESENTLY PREFERRED EMBODIMENT

Figure 1:
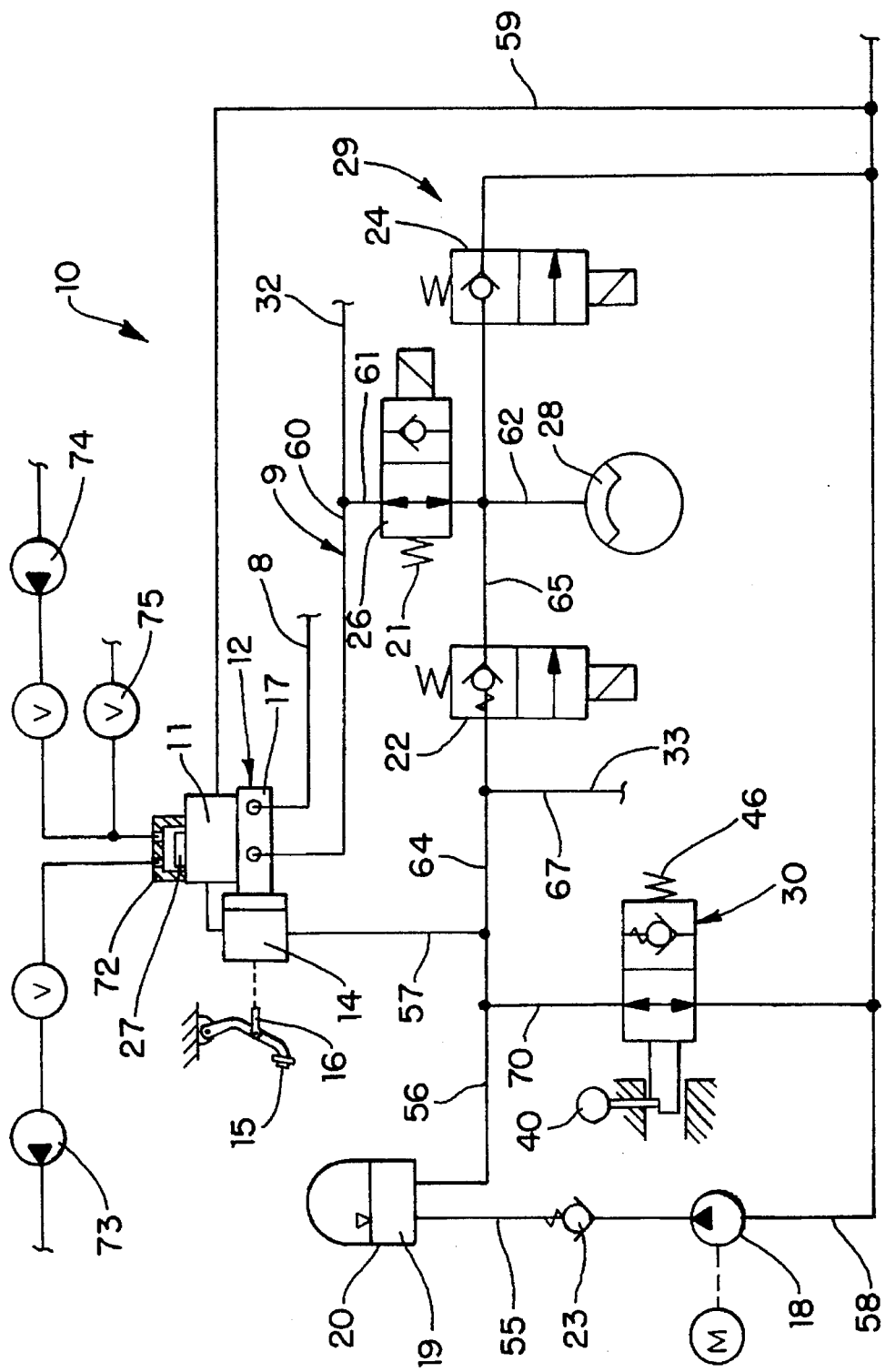
FIG. 1 is a partial diagrammatic illustration of a vehicle braking system.

Referring to the drawings, illustrated in FIG. 1 is that portion of a braking system for supplying one wheel brake 28 through modulator circuit 29 and incorporating features of the present invention. The complete braking system includes three additional wheel brakes (not illustrated), that are operated through modulator circuits that are structurally and functionally equivalent to the modulator circuit 29 for the purposes of the present invention. The modulator circuit 29 includes valves 22, 24, 26 and the communicative passages therebetween. The modulator circuit 29 and the other modulator circuits utilize the common fluid power sources of master cylinder assembly 12 and pump assembly 18.

The overall braking system is designated in the aggregate as 10 and includes the master cylinder assembly 12. The master cylinder assembly 12 includes a reservoir 11 which carries a supply of fluid for operation of the braking system 10. The reservoir 11 is carried on master cylinder body 17 which operatively engages power booster 14. The power booster 14 is hydraulically power operated in a conventional manner and is interconnected with a manual input mechanism designated as brake pedal actuator 15 through push rod 16.

By means of the master cylinder assembly 12 the manual application of force to the brake pedal actuator 15 is transferred through the push rod 16 to the power booster 14. The power booster 14 applies hydraulically assisted power operation to the master cylinder 17 which draws fluid from the reservoir 11 and pressurizes the braking system 10 through the brake lines 8 and 9. As is conventionally known, the brake lines 8 and 9 each supply fluid pressure to two wheels of a vehicle in a split system arrangement. Brake line 9 extends to wheel brake 28 and from point 32 to an additional wheel brake (not illustrated). Similarly, brake line 8 extends to two wheel brakes (not illustrated).

More specifically, the brake line 9 extends to wheel brake 28 through a normally open valve 26 which is solenoid operated and is held in the open position by a return spring 21 when deenergized. The master cylinder assembly 12 is arranged in such a manner that the manual application of force to the brake pedal actuator 15 is ensured of supplying fluid pressure to the wheel brake 28 through the brake line 9 and normally open valve 26.

Under power operation of the system 10 the actuation of master cylinder assembly 12 is assisted through power booster 14. Power booster 14 is supplied with pressurized hydraulic fluid from the accumulator 20 which includes a charged fluid chamber 19. A minimum operating pressure is maintained at all times in fluid chamber 19 by means of motor driven pump assembly 18 with the assistance of check valve 23. The motor driven pump assembly 18 is selectively operated to maintain the pressure at a desirable level so that upon actuation of the master cylinder assembly 12 fluid pressure is available in fluid chamber 19 to operate the hydraulic booster 14. The pump supplies fluid to the accumulator 20 through the conduit 55 and from the chamber 19 fluid pressure is supplied to the hydraulic booster 14 through the conduits 56 and 57. The motor driven pump assembly 18 draws fluid from the reservoir 11 through the conduits 58 and 59.

The brake line 9 is comprised of conduits 60, 61 and 62. Between the conduits 61 and 62 the normally open solenoid valve 26 is actuatable to interrupt the supply of fluid pressure from the master cylinder assembly 12 to the wheel brake 28 when energized. This provides a means of isolating the master cylinder assembly 12 from the wheel brake 28 during ABS operation of the braking system 10.

The normally closed ABS apply valve 22 and the normally closed ABS release valve 24 are provided for ABS operation of the braking system 10 in controlling the wheel brake 28. Similarly, paired valve arrangements are provided for each of the additional wheel brakes of braking system 10 in the same manner.

The normally closed ABS release valve 24 is provided in conduit 64 which between its points of intersection with conduit 62 and conduit 59. Therefore, when the normally closed ABS release solenoid valve 24 is energized thus opening the valve a fluid flow path is provided between conduit 62 of braking line 9 and the reservoir 11 through a segment of conduit 64, valve 24 and conduit 59. The release of fluid through conduit 64 and valve 24 during ABS operation of the braking system 10 is assisted by operation of the motor driven pump assembly 18.

When an incipient wheel lock condition of wheel brake 28 is sensed, as conventionally known in the art, the normally open valve 26 is energized and thus closed to isolate the master cylinder assembly 12 from the wheel brake 28 and thus prevent the application of additional fluid pressure thereto. The motor driven pump assembly 18 is operated and the normally closed ABS release solenoid valve 24 is selectively energized to reduce the pressure at wheel brake 28 and thus avoid wheel lock-up. During ABS operation of the braking system 10 it may become necessary to selectively reapply braking pressure to the wheel brake 28 and thus the normally closed ABS apply valve 22 is selectively opened and the ABS release valve 24 is allowed to close. Braking pressure is thus supplied from the chamber 19 of accumulator 20 through the conduit 56, conduit 64 including segment 65, to the conduit 62 of braking line 9 and therethrough to the wheel brake 28.

Fluid is similarly available through conduit 67 and from the point 33 to an additional ABS supply valve (not illustrated) for an additional wheel brake (not illustrated). Similarly, the conduit 59 extends from the point 34 to an additional three ABS release valves associated with the three additional wheel brakes.

When the braking system 10 is initially assembled in an associated vehicle and the conduit connections made it becomes necessary to fill the system with braking fluid. This is accomplished by introducing fluid through the master cylinder assembly 12 and particularly, through the reservoir 11. However, as can be seen from the illustration of FIG. 1, without the presence of manually released access valve 30, fluid thus introduced will be limited to travel through the braking line 9 including the normally open valve 26 to the wheel brake 28 but will be restricted from traveling through the ABS release valve 24. The fluid will also be restricted from traveling through the ABS apply valve 22 since the check feature thereof is designed such as to remain closed even during normal braking pressurization of the wheel brake 28 and thus for all practical purposes will be unopenable during the filling process of the braking system 10.

Similarly, fluid introduced through the line 59 from the reservoir 11 will be obstructed from proceeding beyond the motor driven pump assembly 18 which is a positive displacement pump and the ABS release valve 24. Accordingly, that part of the braking system 10 including conduit 55, chamber 19, conduit 56, conduit 57, hydraulic booster 14 and conduit 64 upstream of segment 65, will be, in-effect, inaccessible for purposes of an evacuation and fill process at the master cylinder assembly 12.

To open the otherwise inaccessible part of the braking system 10, bridging line 70 is provided, which extends between the conduit 59 and the conduit 56. Bridging line 70 opens the otherwise inaccessible part of the braking system 10 to the conduit 59 for evacuation and fill through the master cylinder assembly 12. However, the presence of bridging line 70, if left open would interfere with the normal operation of the braking system 10. Therefore, the manually released access valve 30 is provided in bridging line 70.

The manually released access valve 30 is a normally closed valve which is held in an open position by pin 40. The manually released access valve 30 is illustrated in greater detail in FIG. 2 and therefore, reference is directed thereto. The manually released access valve 30 includes a body 35 that has a stepped bore 36 with a port 37. The stepped bore 36 is intersected by a bore 38 with a port 39. The port 37 is connected to the bridging line 70 on the side that extends to conduit 56 and therefore, is generally subjected to high pressure from the chamber 19 of accumulator 20. The port 39 is connected to the bridging line 70 on the side that extends to the conduit 59.

Figure 2:
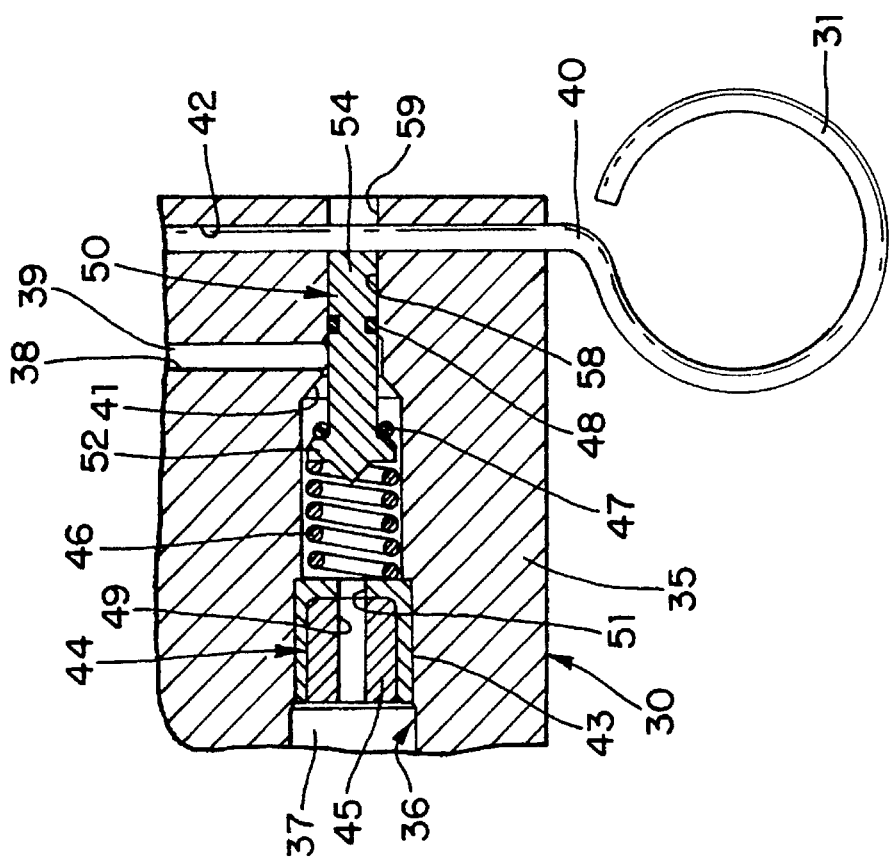
FIG. 2 is a fragmentary cross sectional illustration of the normally closed valve used in evacuation and fill of the braking system of FIG. 1 shown held in an opened position.

The stepped bore 36 carries a moveable valve element 50 that is initially held in the position illustrated in FIG. 2 so that an open flow path is provided between the ports 37 and 39 through the manually released access valve 30. Therefore, when the braking system 11 is initially assembled, the manually released access valve 30 is held in the open position as shown in FIGS. 1 and 2, so that an open means of communication is provided through the bridging line 70.

Moveable valve element 50 includes a head 52 and an integral shaft 54 which extends into reduced diameter segment 58 of stepped bore 36. The shaft 54 carries a seal 48 which bears against body 35 in reduced diameter segment 58 and the head 52 carries a seal 47 which is engageable with the body at seat 41.

A spring 46 is carried in stepped bore 36 and is compressed between the head 52 and expansion plug 44. The expansion plug 44 is fixed in stepped bore 36 and includes a substantially cylindrical portion 43 which engages spring 46 and an orifice plug 45 which is pressed into cylindrical portion 43 fixing the expansion plug in position within the stepped bore 36. The orifice plug portion 45 includes an opening 49 and the substantially cylindrical portion includes an opening 51 for providing a continuous opening through the expansion plug 44 and coaxially through the stepped bore 36.

The head 52 of moveable valve element 50 is held away from the valve seat 41 by a pin 40 which is received within bore 42 of body 35. The pin 40 engages the shaft 54 of moveable valve element 50 compressing the spring 46 and an open flow path between the ports 37 and 48 through the manually released access valve 30. The pin 40 is slip-fit within the bore 42 and is held therein by a bias applied by spring 46 through movable valve element 50. The pin 40 includes a ring 31 and is easily manually removable from the bore 42.

Figure 3:
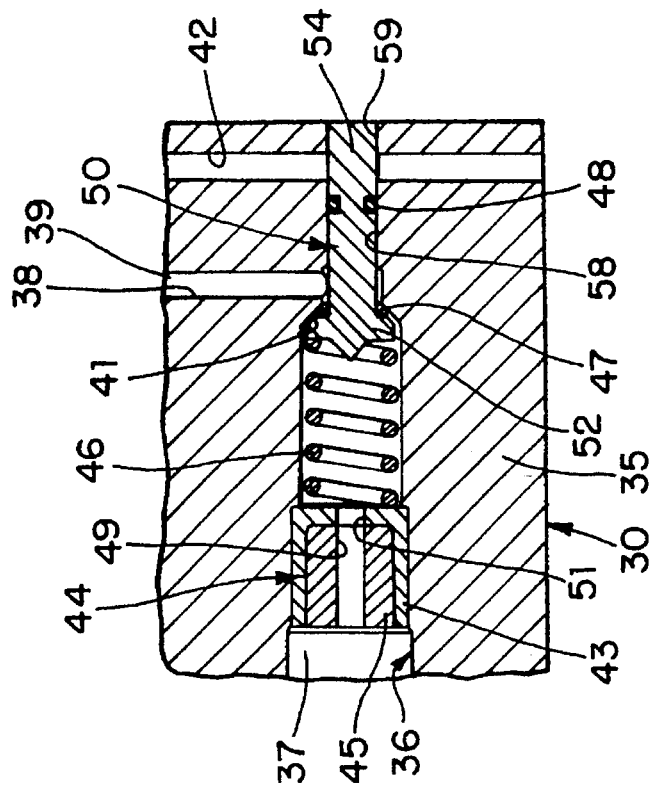
FIG. 3 is a fragmentary cross sectional illustration of the valve of FIG. 2 shown released to its normally closed position.

Referring to FIG. 3, the manually released access valve 30 is illustrated in its released and closed position. When evacuation and fill of the braking system 10 is complete, the pin 40 is manually withdrawn from the bore 42 so that the spring 46 forces the moveable valve element 50 to close the manually released access valve 30. The seal 37 is compressed between the head 52 and valve seat 41 ensuring a secure seal between the ports 37 and 39. The fluid pressure maintained by the braking system in chamber 19 of accumulator 20 is communicated through port 37 and assists in maintaining the manually released access valve 30 in the closed position.

Should it be necessary to reopen the manually released access valve 30 such as during servicing of the braking system 10 the moveable valve element 50 can be forced to re-compress spring 46 and open a flow path between ports 37 and 39 by inserting a tool (not illustrated) through the opening 59 causing the shaft 54 to slide within the bore 58.

Referring again to FIG. 1, evacuation and fluid fill of the braking system 10 can through means of the present invention, be fully accomplished with the interposed bridging line 70 and manually released access valve 30 in place. When the braking system 10 has been completely assembled in a vehicle, the only opening will be through the master cylinder assembly 12 and specifically through the reservoir 11. The conventional bleed valves (not illustrated), provided at the wheel brake 28 and the other wheel brakes remain closed.

An evacuation and fill head 72 is placed over the fill opening 27 of the reservoir 11. Pump 73 is used to evacuate air from the braking system 10. In the present embodiment, the pump 73 is operated such that a vacuum of approximately 2 millimeter of mercury is created in the braking system 10. The bridging line 70 and manually released access valve 30 permit pulling a vacuum in the otherwise inaccessible part of the system including conduits 55, 56 and 57 and hydraulic booster 14 along with chamber 19 of accumulator 20.

After evacuation of the braking system 10, braking fluid is introduced through the pump 74, charging head 72 and fill opening 27 to the reservoir 11 and the fluid is distributed throughout the braking system 10. In the present embodiment the system is pressurized to approximately 75 psi. Through means of the bridging line 70 and manually released access valve 30 the otherwise inaccessible part of the system is filled with fluid.

After the filling process is complete, pressure is relieved from the system through the valve 75 and the pin 40 is pulled from the manually released access valve 30 whereby the spring 46 moves the manually released access valve 30 to its normally closed position completing evacuation and fluid fill of the braking system 10. The manually released access valve 30 remains in the closed position during all braking and other functional operation of the braking system 10.

Through means of the present embodiment, the braking system 10 is completely charged with braking fluid without opening the bleed valves at the wheel brakes and without energizing the ABS function valves to open positions. The manually released access valve 30 is adaptable to provide a bridging line with multiple branches should the braking system so require.

Figure 4:
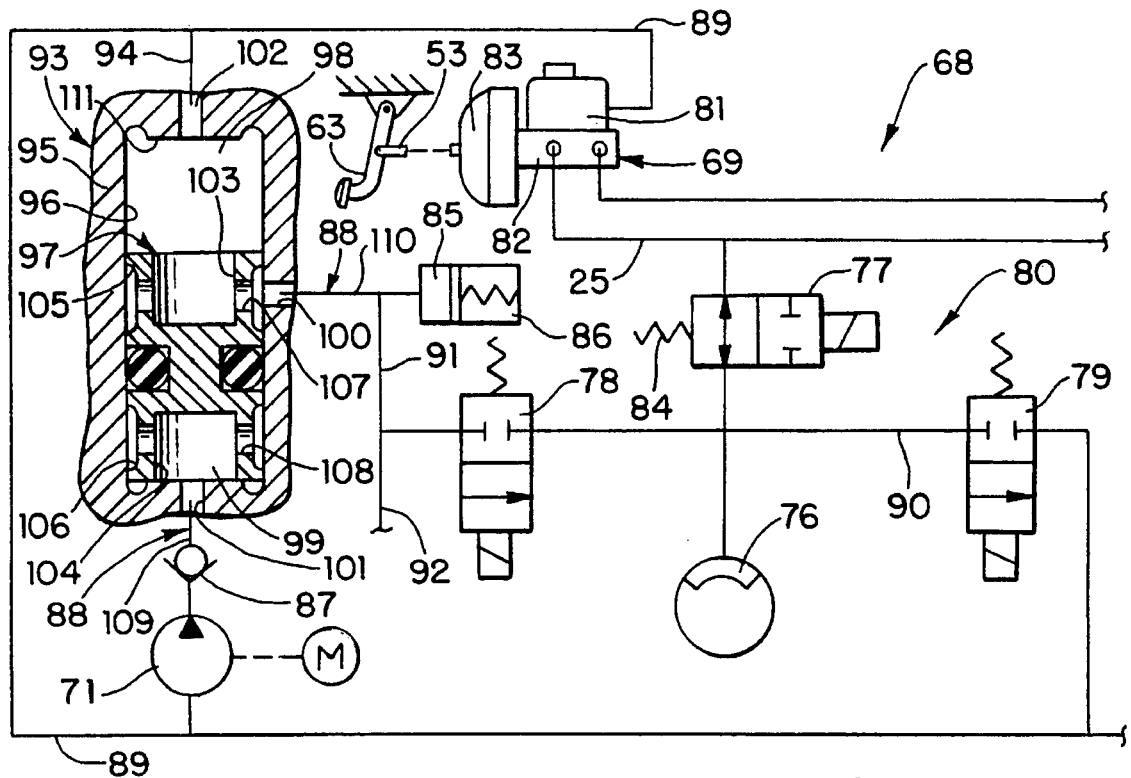
FIG. 4 is a partial diagrammatic illustration of a vehicle braking system with the access valve in an open position.

Referring to FIG. 4 an additional embodiment of the present invention is illustrated. Shown is that portion of a braking system for supplying one wheel brake 76 through modulator circuit 80 and incorporating features of the present invention. The complete braking system includes three additional wheel brakes (not illustrated), that are operated through modulator circuits that are structurally and functionally equivalent to the modulator circuit 80 for the purposes of the present invention. The modulator circuit 80 includes valves 77, 78, 79 and the network of communicative passages therebetween. The modulator circuit 80 and the other modulator circuits, (not illustrated), utilize the common fluid power sources of master cylinder assembly 69 and pump assembly 71.

The overall braking system is designated in the aggregate as 68 and includes the master cylinder assembly 69. The master cylinder assembly 69 includes a reservoir 81 which carries a supply of fluid for operation of the braking system 68. The reservoir 81 is carried on master cylinder body 82 which operatively engages power booster 83. The power booster 83 is vacuum power operated in a conventional manner and is interconnected with a manual input mechanism designated as brake pedal actuator 63 through push rod 53.

Brake line 25 extends to wheel brake 76 through a normally open valve 77 which is solenoid operated and is held in the open position by a return spring 84 when deenergized. The master cylinder assembly 69 is arranged in such a manner that the manual application of force to the brake pedal actuator 63 is ensured of supplying fluid pressure to the wheel brake 76 through the brake line 25 and normally open valve 77.

Under power operation of the braking system 68 the actuation of master cylinder assembly 69 is assisted through power booster 83 to actuate wheel brake 76. Also during power operation of the braking system 68, the pump assembly 71 and accumulator 86 provide a means of actuating the wheel brake 76 in response to the displacement of brake pedal 63 and optionally, independently thereof. A minimum operating pressure is maintained at all times in fluid chamber 85 of accumulator 86 by means of motor driven pump assembly 71 with the assistance of check valve 87.

The motor driven pump assembly 71 is selectively operated to maintain the pressure at a desirable level so that upon actuation of the master cylinder assembly 69 fluid pressure is available in fluid chamber 85 to actuate the wheel brake 76 with simultaneous isolation of the master cylinder assembly 69 from the wheel brake 76 effected by closure of the valve 77. The pump supplies fluid to the accumulator 86 through the conduit 88. The pump assembly 71 draws fluid from the reservoir 81 through the conduit 89.

The normally closed ABS apply valve 78 and the normally closed ABS release valve 79 are provided for ABS operation of the braking system 68 in controlling the wheel brake 76. Similarly, paired valve arrangements are provided for each of the additional wheel brakes of braking system 68 in the same manner.

The normally closed ABS release valve 79 is provided in conduit 90 which extends between the brake line 25 and the conduit 89. Therefore, when the normally closed ABS release solenoid valve 79 is energized, thus opening the valve, a fluid flow path is provided between braking line 25 and the reservoir 81 through conduit 90, valve 79 and conduit 89. The release of fluid therethrough during ABS operation of the braking system 68 is assisted by operation of the motor driven pump assembly 71.

When an incipient wheel lock condition of wheel brake 76 is detected, as conventionally known in the art, the normally open valve 77 is energized and thus closed to isolate the master cylinder assembly 69 from the wheel brake 76 and thus prevent the application of additional fluid pressure thereto. The motor driven pump assembly 71 is operated and the normally closed ABS release solenoid valve 79 is selectively energized to reduce the pressure at wheel brake 76 and thus avoid wheel lock-up. During ABS operation of the braking system 68 it may become necessary to selectively reapply braking pressure to the wheel brake 76 and thus the normally closed ABS apply valve 78 is selectively opened and the ABS release valve 79 is allowed to close. Braking pressure is thus supplied from the chamber 85 of accumulator 86 through the conduit 91 and brake line 25 to the wheel brake 76.

Fluid is similarly available through conduit 91 and from the point 92 to an additional ABS apply valve (not illustrated) for an additional wheel brake (not illustrated).

When the braking system 68 is initially assembled in an associated vehicle and the conduit connections made it becomes necessary to fill the system with braking fluid. This is accomplished by introducing fluid through the master cylinder assembly 69 and particularly, through the reservoir 81. However, as can be seen from the illustration of FIG. 1, without the presence of automatic access valve 93, fluid thus introduced will be prevented from entering conduit 91, conduit 88 and fluid chamber 85 of accumulator 86. This would leave an excessive volume of the system 68 uncharged and containing air. Therefore, the evacuation and fill of the braking system 68 through the master cylinder assembly 69 would be prohibited.

To open the otherwise inaccessible part of the braking system 68, bridging line 94 is provided, which extends between the conduit 89 and the conduit 88. Bridging line 94 opens the otherwise inaccessible part of the braking system 68 to the conduit 89 for evacuation and fill through the master cylinder assembly 69. However, the presence of bridging line 94, if left open would interfere with the normal operation of the braking system 68. Therefore, the automatic access valve 93 is provided in bridging line 94.

The automatic access valve 93 is placed as close as possible to the pump assembly 71 to minimize the system volume therebetween. This is because the pump assembly 71 is a positive displacement type and will inhibit transmission of the fluid charge. The automatic access valve 93 separates conduit 88 into segment 109 adjacent pump assembly 71 and segment 110 adjacent accumulator 86.

The automatic access valve 93 includes a body 95 with a bore 96 defined therein. A piston and seal assembly 97 operates as a moveable element and separates chambers 98 and 99 within the bore 96. Chamber 98 is continuously open to conduit 94 through port 102 and therethrough to reservoir 81. Chamber 99 is continuously open to conduit 88 through port 101 and therethrough to pump assembly 71. A port 100 is provided in automatic access valve 93 and is through conduit 88 to accumulator 86. The port 100 is opened to either chamber 98 or chamber 99 by the piston and seal assembly 97.

The piston and seal assembly 97 includes a first side facing chamber 98 and a second side facing chamber 99. The first side includes a longitudinal bore 103 and the second side includes a longitudinal bore 104. An annular groove 105 is formed in the piston and seal assembly 97 coaxially with longitudinal bore 103 and an annular groove 106 is formed in the piston and seal assembly 97 coaxially with longitudinal bore 104. A cross bore 107 intersects longitudinal bore 103 and annular groove 105. Similarly, a cross bore 108 intersects longitudinal bore 104 and annular groove 106.

When the brake system 68 is assembled the piston and seal assembly 97 is positioned in the bore 96 as shown in FIG. 4. In this position, the conduit 91 and the accumulator 86 are open to the reservoir 81 through the segment 110 of conduit 88, port 100, annular groove 105, cross bore 107, longitudinal bore 103, chamber 98, port 102, bridging line 94 and conduit 89. Therefore, when the braking system is evacuated and filled through the reservoir 81, the otherwise inaccessible part of the system including segment 110, accumulator 86 and conduit 91 is also evacuated and filled with braking fluid. Frictional seal force of the piston and seal assembly 97 within the bore 96 holds the automatic access valve in the position shown in FIG. 4.

Figure 5:
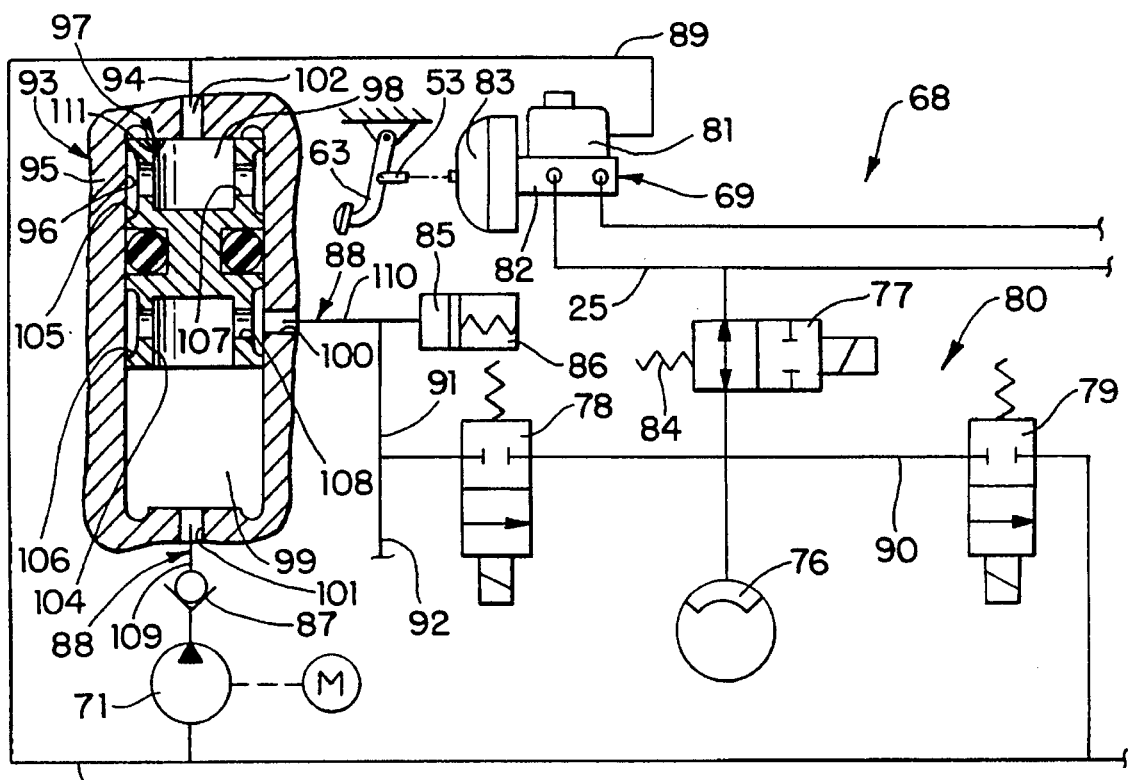
FIG. 5 is a partial diagrammatic illustration of the braking system of FIG. 4 with the access valve in a closed position.

Referring to FIG. 5, the braking system 68 is illustrated in its operable state. The piston and seal assembly 97 of automatic access valve is shifted to the position illustrated the first time the pump assembly 71 is operated. Fluid force generated in segment 109 by the pump assembly 71 drives the piston and seal assembly 97 to the end 111 of bore 96. The port 102 is permanently closed off from the ports 100 and 101 of the automatic access valve 93 by the piston and seal assembly 97. The presence of pump and accumulator pressure in chamber 99 and reservoir pressure in chamber 98 ensures that the piston and seal assembly 97 remains against end 111 during all operations of the braking system 68.

During operation of the pump assembly 71, fluid is transmitted to the accumulator 86 and the ABS apply valve 78 through the conduit 88 and therefore, through the automatic access valve 93. Fluid flows through segment 109, port 101, chamber 99, longitudinal bore 104, cross bore 108, annular groove 106, port 100 and segment 110 to accumulator 86.

Through means of the present embodiment, the braking system 68 is substantially, completely charged with braking fluid without opening the bleed valves at the wheel brakes and without energizing the ABS function valves to open positions. The automatic access valve 93 is adapted to provide a bridging line with multiple branches connected to the port 100 should the braking system so require.

What is claimed is:

1. A fluid power system comprising:
   a closed loop system of communicative passageways;
   a pump interconnected in the system of communicative passageways;
   a normally closed valve interconnected in the system of communicative passageways;
   an access opening to the system of communicative passageways wherein a section of the system of communicative passageways is normally inaccessible from the opening due to positioning of the normally closed valve;
   an access valve providing a charging route between the access opening and the normally inaccessible section, wherein the access valve is initially provided in an open position, wherein the fluid power system is operable to provide fluid powered functions and wherein during all fluid powered functions provided by system operation the access valve is in a completely closed position.

2. A fluid power system according to claim 1 wherein the access valve includes a moveable element that is initially held in the open position by a manual pull pin.

3. A fluid power system according to claim 2 wherein the moveable element is moved to the closed position by a spring.

4. A fluid power system according to claim 1 wherein the access valve includes a moveable element that is initially held in the open position by a frictional seal force.

5. A fluid power system according to claim 4 wherein the moveable element is moved to the closed position solely by fluid pressure.

6. A braking system filled with fluid comprising:
   a master cylinder assembly;
   a wheel brake;
   a first brake line extending between the master cylinder and the wheel brake;
   a second brake line extending from the first brake line;
   a normally closed ABS valve positioned in the second brake line;
   a bridging line extending from the second brake line; and
   a normally closed access valve positioned in the bridging line that is in an open position during the evacuation and fill process, then moved to a closed position and remaining in the closed position during all braking operation of the braking system.

7. A braking system according to claim 6 wherein the access valve includes a moveable element that is initially held in the open position by a manual pull pin.

8. A braking system according to claim 7 wherein the moveable element is moved to the closed position by a spring.

9. A braking system according to claim 6 wherein the access valve includes a moveable element that is initially held in the open position by a frictional seal force.

10. A braking system according to claim 9 wherein the moveable element is moved to the closed position solely by a fluid force.

11. A vehicle braking system comprising:
    a master cylinder:
    a brake line leading from the master cylinder;
    a pump assembly interconnected with the brake line by a conduit;
    a wheel brake connected to the brake line actuatable in response to operation of the master cylinder and actuatable in response to operation of the pump assembly;
    a normally open valve connected in the brake line between the master cylinder and the wheel brake;
    a normally closed valve connected in the conduit between the pump assembly and the wheel brake wherein a segment of the conduit between the pump assembly and the normally closed valve is inaccessible form the master cylinder due to presence of the normally closed valve;
    a bridging line providing an opening between the master cylinder and the segment of the conduit between the pump and the normally closed valve;
    an access valve positioned in the bridging line having a first position wherein the segment is open to the master cylinder and the pump assembly is closed off from the normally closed valve and having a second position wherein the segment is closed to the master cylinder and the pump is open to the normally closed valve wherein the access valve is in the second position during all actuation of the wheel brake regardless of whether in response to operation of the master cylinder or the pump assembly.

12. A vehicle braking system according to claim 11 wherein the access valve includes a moveable element that is initially held in the open position by a manual pull pin.

13. A braking system according to claim 12 wherein the moveable element is moved to the closed position by a spring.

14. A braking system according to claim 11 wherein the access valve includes a moveable element that is initially held in the open position by a frictional seal force.

15. A braking system according to claim 14 wherein the moveable element is moved to the closed position solely by a fluid force.

16. A vehicle braking system according to claim 11 wherein the vehicle braking system is substantially completely assembled and then a braking fluid is added by an evacuation and fill process through the master cylinder with the access valve in the first position wherein a charging head is placed on the master cylinder and the vehicle braking system is evacuated and filled with braking fluid through the charging head without providing any other openings to the vehicle braking system and then the access valve is moved to the closed position.

17. A vehicle braking system according to claim 16 wherein the access valve includes a moveable element that is initially held in the open position by a manual pull pin.

18. A braking system according to claim 17 wherein the moveable element is moved to the closed position by a spring.

19. A braking system according to claim 16 wherein the access valve includes a moveable element that is initially held in the open position by a frictional seal force.

20. A braking system according to claim 19 wherein the moveable element is moved to the closed position solely by a fluid force.

* * * * *